No. 894,336. PATENTED JULY 28, 1908.
G. B. MILLS.
ADJUSTABLE WAGON RACK.
APPLICATION FILED DEC. 27, 1907.

2 SHEETS—SHEET 1.

Witnesses

Inventor
George B. Mills.
By C. A. Snow & Co.
Attorneys

No. 894,336.
PATENTED JULY 28, 1908.
G. B. MILLS.
ADJUSTABLE WAGON RACK.
APPLICATION FILED DEC. 27, 1907.
2 SHEETS—SHEET 2.
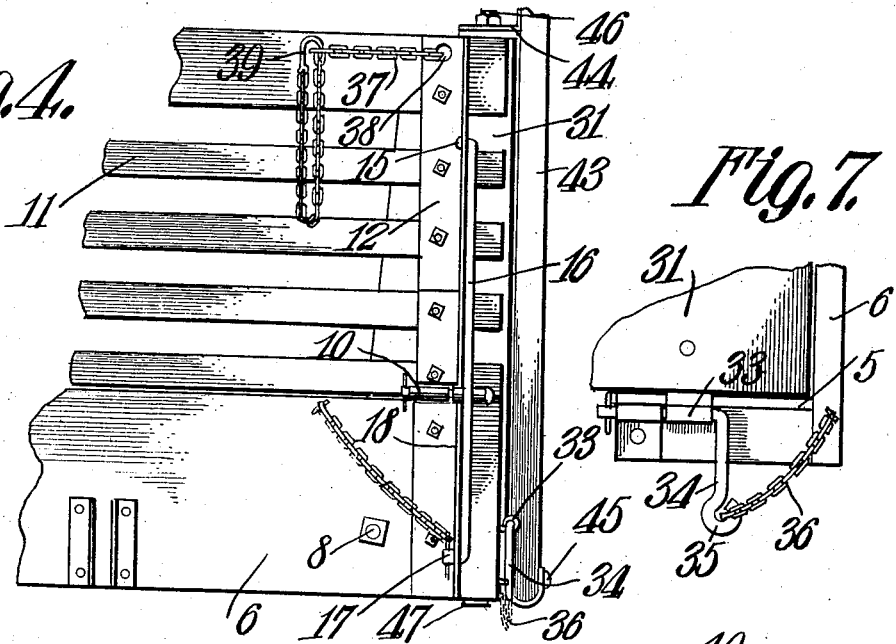
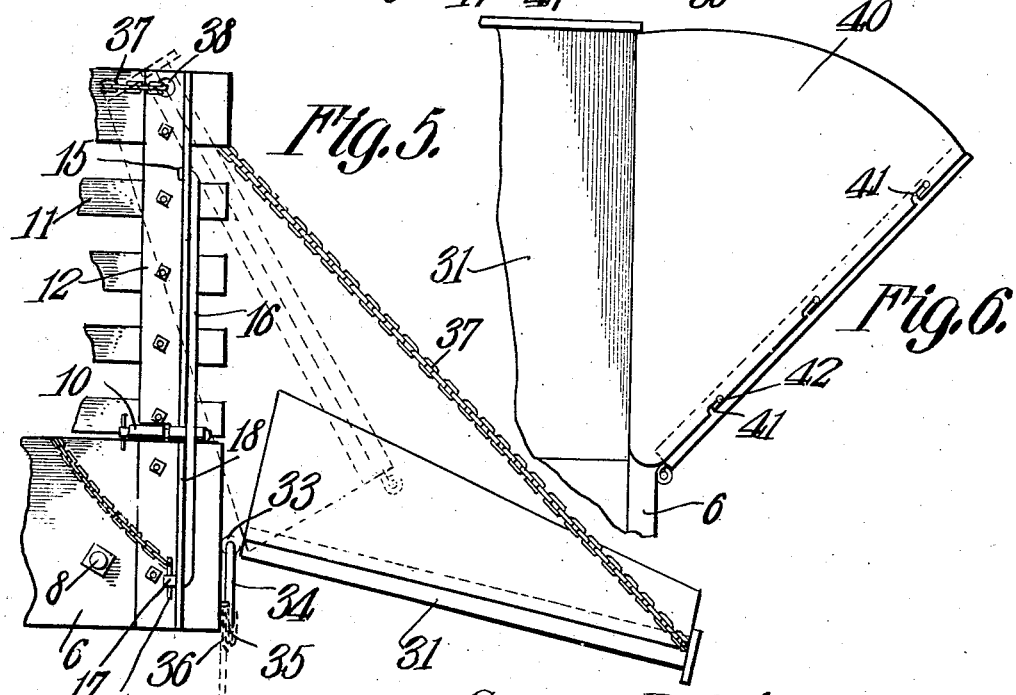

UNITED STATES PATENT OFFICE.

GEORGE B. MILLS, OF NAPPANEE, INDIANA, ASSIGNOR OF ONE-HALF TO JOHN W. BROWN, OF NAPPANEE, INDIANA.

ADJUSTABLE WAGON-RACK.

No. 894,336.   Specification of Letters Patent.   Patented July 28, 1908.

Application filed December 27, 1907. Serial No. 408,265.

*To all whom it may concern:*

Be it known that I, GEORGE B. MILLS, a citizen of the United States, residing at Nappanee, in the county of Elkhart and State of Indiana, have invented a new and useful Adjustable Wagon-Rack, of which the following is a specification.

This invention relates to hay racks and has for its object to provide a strong, durable and thoroughly efficient device of this character the side walls of which may be adjusted at any angle or inclination with respect to the wagon bed and securely locked in adjusted position.

A further object of the invention is to provide a hay rack having an end gate capable of being swung downwardly and used as a shoveling board and which may also be used for automatically dumping the load.

A further object is to provide means for bracing the pivoted end gate when the latter is in closed position and further to provide the stationary end gate with a detachable pole or upright which coöperates with the vertical brace of the movable gate to assist in retaining the load in position when transporting hay and similar material.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
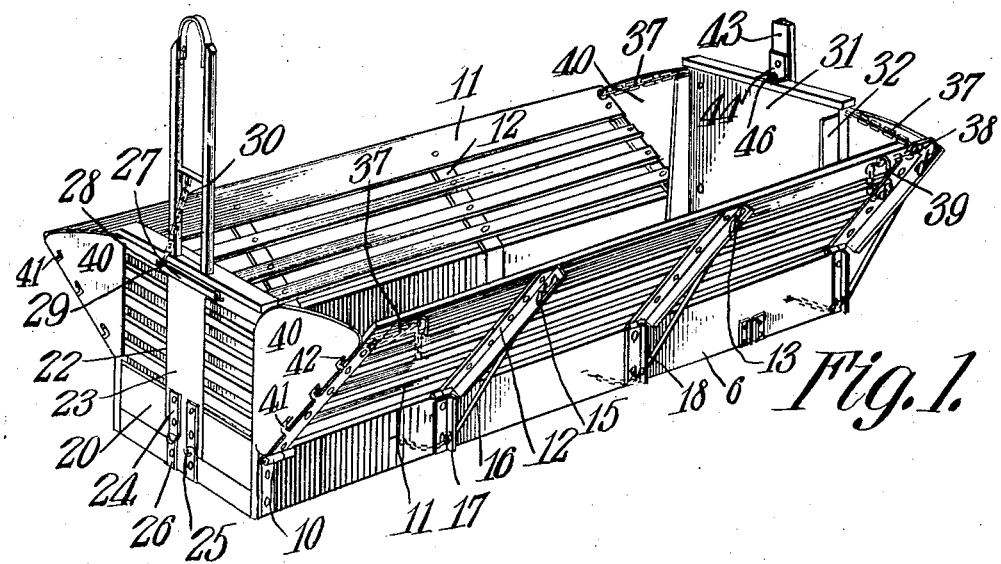
Figures 2, 3:
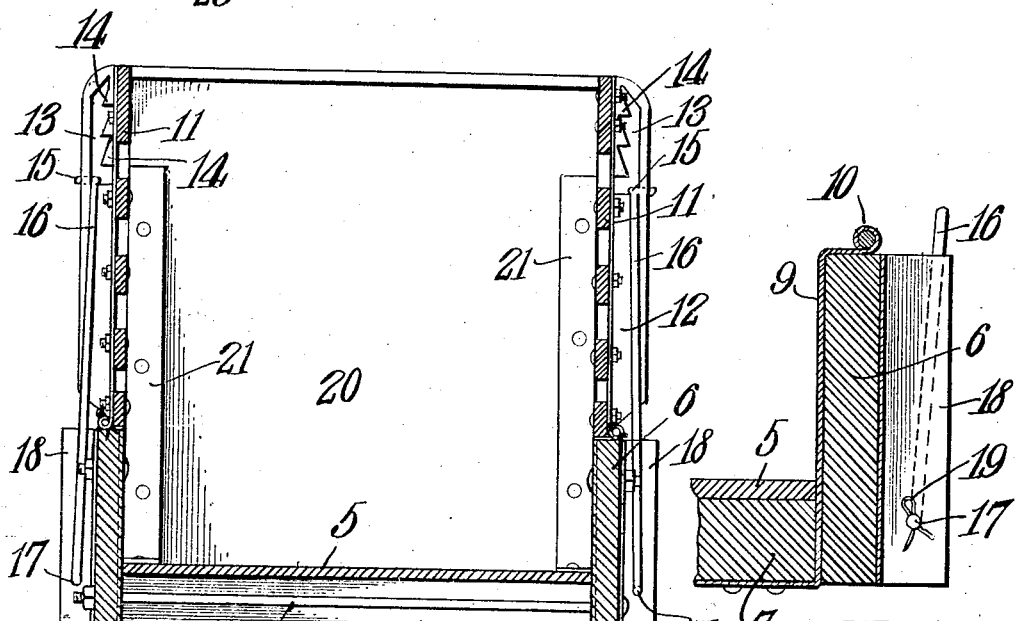

In the accompanying drawings forming a part of this specification: Figure 1 is a perspective view of a hay rack constructed in accordance with my invention. Fig. 2 is a transverse sectional view of the same. Fig. 3 is an enlarged detail sectional view of Fig. 2. Fig. 4 is a side elevation of a portion of one end of the hay rack. Fig. 5 is a similar view showing in full lines the movable end gate swung downwardly when used as a shoveling board, and in dotted lines the lower end of said end gate swung upwardly to permit dumping of the load. Fig. 6 is a detail end view showing the manner of supporting the auxiliary end pieces in position on the side members of the rack. Fig. 7 is a rear elevation of a portion of the movable end gate.

Similar numerals of reference indicate corresponding parts in all of the figures of the drawings.

The improved hay rack forming the subject matter of the present invention comprises a body portion consisting of a bed plate 5 having oppositely disposed longitudinal sills 6 secured thereto and which in conjunction with the bed plate constitutes the body of the wagon.

The side rails or sills 6 preferably project a short distance below the bed plate and interposed between the projecting ends of said sills and bearing against the bottom of the bed plate is a plurality of spaced transverse bars 7, there being one or more reinforcing tie rods 8 extending transversely of the bed plate near some of the bars 7 to assist in reinforcing and bracing the body portion.

Secured to the inner faces of the sills 6 are substantially Z shaped brackets 9, the lower ends of which extend beneath the adjacent transverse bars 7 while the upper ends thereof are bent laterally over the upper longitudinal edges of the sills 6 and are thence bent upon themselves to form terminal loops or eyes 10.

Pivotally mounted for swinging movement on the sills 6 are the side members 11 of the rack, said members being adjustable laterally with respect to the bed plate 5 and preferably formed of a plurality of longitudinal slats spaced apart by reinforcing bars or brackets 12.

The brackets 12 are preferably formed of angle bars, one flange of each angle bar being bolted or otherwise rigidly secured to the adjacent side member 11, while the other flange is formed with an elongated slot 13 having a plurality of locking teeth 14 projecting within the same for engagement with the hooked terminal 15 of a locking rod 16.

The lower ends of the locking rods 16 are pivotally mounted at 17 on angle plates 18 secured to the longitudinal sills 6 at the brackets 9, the pivoted ends of the locking rods 16 being extended through openings in the angle brackets 18 and provided with terminal apertures for the reception of cotter pins 19 whereby the rods may be readily detached from the brackets when desired.

Arranged at one end of the body portion is a stationary end gate 20 to the inner face of which are secured vertical braces 21 which are bolted or otherwise rigidly secured to the bed plate 5 and by means of which the end gate is rigidly supported in vertical position.

The inner face of the stationary end gate 20 is imperforate while the outer face thereof is formed with a plurality of transverse slats, the inner ends of which are spaced apart to form an intermediate recess 22 for the reception of an upright member 23, the latter being used to assist in preventing accidental displacement of the load when the rack is employed for booming and transporting hay.

Secured to the lower end of the upright 23 are spaced brackets 24 provided with terminal hooks 25 which engage eyes formed in corresponding plates 26 secured to the body portion and which serve to lock the lower end of the upright against accidental displacement.

A latch 27 is pivotally mounted on one side of the recess and extends transversely across the upright 23 for engagement with a suitable keeper 28, there being a cotter pin 29 connected with the upright by a chain 30 and engaging the keeper for holding the latch 27 in locked position.

The movable end gate 31 is provided with oppositely disposed inwardly extending flanges 32 which, when the gate is swung downwardly to the position shown in Fig. 5 of the drawings, permits said gate to be used as a shoveling board.

The movable end gate 31 is pivotally mounted at 33 on the bed plate 5 and is detachably combined with said bed plate by means of movable pins 34 which extend through the eyes 33 and constitute the pivotal axis of the end gate, as shown.

The pins 34 are formed with angularly disposed arms having terminal eyes 35 for the reception of chains 36, which latter are secured to the longitudinal sill 6 and serve to prevent the pins from getting lost when the same are detached from said eyes.

Secured to the opposite longitudinal edges of the end gates 20 and 31 are chains 37 which pass through openings 38 formed in the adjacent brackets 12 and are provided with terminal hooks 39 for engagement with the side members 11 of the rack, thereby to assist in supporting the side members in adjusted position.

As a means for preventing the escape of corn or other material from the wagon when the side walls are adjusted laterally there are provided substantially triangular shaped plates 40 which are interposed between the end pieces and the adjacent side members 11 and constitute auxiliary end pieces.

One longitudinal edge of each end piece 40 is provided with a plurality of spaced bayonet slots 41 adapted to receive suitable pins 42 extending laterally from the adjacent ends of the side members 11 thereby to retain the plates 40 in position on the side members.

Associated with the movable end gate 31 is an upright or brace 43, the upper end of which is provided with a laterally extending arm 44 which engages the upper or free end of the end gate while the lower end thereof is secured to the adjacent transverse bar of the bed plate by a bolt or similar fastening device 45.

The arm 44 is pierced by an opening in which is seated a vertically disposed rod 46, which latter extends through the end gate 31 and wagon body and is clamped in engagement with a segmental plate 47 fastened to the adjacent lower transverse bar 7 of the bed plate, as shown.

The vertical brace 43 is used in connection with the movable end gate when the rack is employed for transporting hay, said brace or upright coöperating with the upright 23 on the stationary member to assist in preventing accidental displacement of the load.

It will thus be seen that by releasing the hooked ends 15 of the locking rods 16 from engagement with the teeth 14, the side walls or members 11 may be adjusted laterally at any angle or inclination with respect to the wagon bed thereby increasing or diminishing the capacity of the rack. It will also be noted that the side members 11 may be moved upwardly in contact with the adjacent vertical edges of the end gates so as to present a substantially rectangular body portion, as best shown in Fig. 2 of the drawings.

In order to open the movable end gate it is merely necessary to release the adjacent chains 37 when the end gate may be swung downwardly to the full line position shown in Fig. 5 of the drawings and in which position said end gate may be employed either as a shoveling board or for loading stock.

When it is desired to automatically dump the load it is merely necessary to detach the pins 34 from engagement with the eyes 33 when the pressure of the corn or other material in the wagon box will force the lower end of the end gate rearwardly and upwardly to the dotted line position shown in Fig. 5 of the drawings thus permitting the discharge of the contents of the wagon.

When the rack is used for loading and transporting hay the vertical brace 43 is clamped in position on the movable end gate in the manner before described.

From the foregoing description it is thought that the construction and operation of the device will be readily understood by those skilled in the art and further description thereof is deemed unnecessary.

Having thus described the invention what is claimed is:

1. A hay rack including a body portion comprising a bed plate having longitudinal sills connected by transverse bars, side members pivotally mounted for lateral movement on the longitudinal sills, stationary and movable end gates interposed between the side members, one of said end gates being provided with a vertical seating recess, plates secured to one of the transverse bars of the body portion and provided with terminal eyes, an upright seated in said recess and provided with plates having terminal hooks for engagement with said eyes, a latch pivotally mounted on said end gate for locking the upright against accidental displacement, and means for locking the side members in adjusted position.

2. A hay rack comprising a body portion, laterally adjustable side members pivotally connected with the body portion, stationary and movable end gates interposed between the side members, hinges forming a pivotal connection between the movable end gate and body portion and provided with eyes, removable pins seated in said eyes, chains connecting the pins with the body portion, a vertical brace secured to the exterior wall of the movable end gate and provided with a laterally extending perforated arm projecting over the top of said end gate, a bolt extending through the perforation in said arm and engaging the body portion, a removable upright seated in a recess in the stationary end gate and coöperating with the brace for retaining the load in position on the rack, and means for locking the side members in adjusted position.

3. A hay rack including a body portion, laterally adjustable side members pivotally connected with the body portion, relatively stationary and movable end gates interposed between the side members, pins extending laterally from the side members, plates interposed between the side members and end gates and provided with bayonet slots for the reception of the pins on the side members, and means for locking the side members in adjusted position.

In testimony that I claim the foregoing as my own, I have hereto affixed my signature in the presence of two witnesses.

GEORGE B. MILLS.

Witnesses:
PANSY B. KAUTZ,
ELIAS BLOSSER.